UNITED STATES PATENT OFFICE.

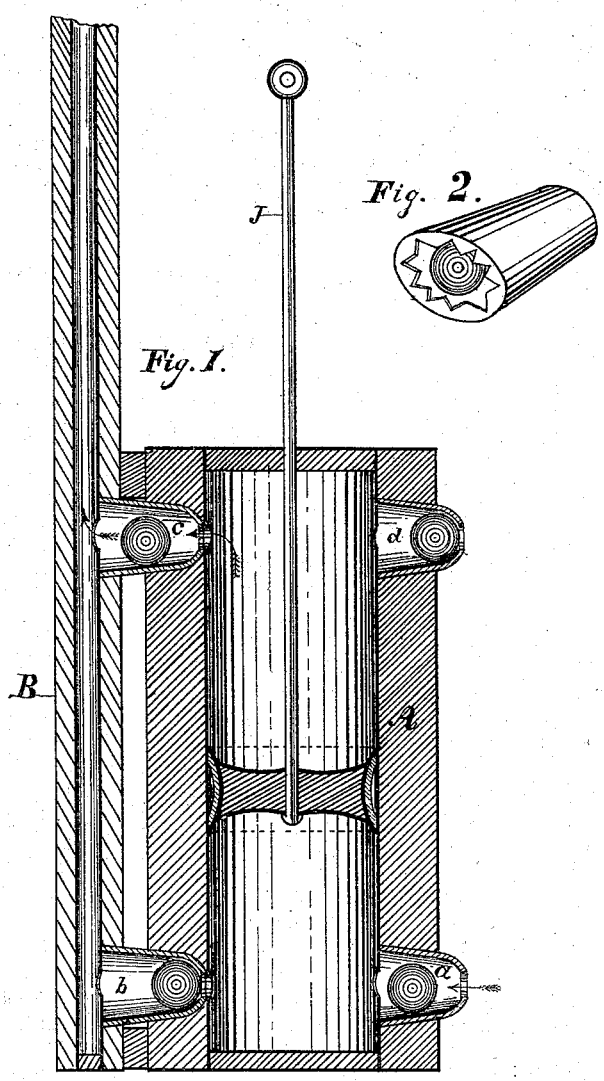

JAMES T. DALE AND JOHN V. MYERS, OF INDUSTRY, ILLINOIS.

IMPROVEMENT IN PUMPS.

Specification forming part of Letters Patent No. 156,839, dated November 17, 1874; application filed August 22, 1874.

*To all whom it may concern:*

Be it known that we, JAMES T. DALE and JOHN V. MYERS, of Industry, in the county of McDonough and State of Illinois, have invented new and useful Improvements in Pumps; and we do hereby declare that the following is a full and exact description of the same, reference being had to the accompanying drawings, and to the letters of reference marked thereon.

This invention relates to that class of pumps which is double acting, and is adapted to all domestic purposes; and its novelty consists in constructing thimbles in which are suitable balls which act as valves, and are placed in the pump-stock in such a manner that the sediment will not lodge on and prevent them from acting.

In the drawings, Figure 1 is a vertical section. Fig. 2 shows the thimble and ball in perspective.

To enable others skilled in the art to make and use our invention, we will now proceed to describe fully its construction.

A represents the body of the pump, which is constructed out of any suitable material, to which is attached the pipe B. The pump-body A has inserted in it thimbles $a$, $b$, $c$, and $d$. The thimbles $b$ and $c$ extend through and into the pipe B. These thimbles are constructed out of any suitable metal, with the sides somewhat flaring, as shown. Inside of these thimbles we place balls, which act as valves. (Shown in Fig. 1.) The large end of the thimble is covered with a screen, (shown in Fig. 2,) which keeps the ball in its proper place, and allows the water a free passage out.

The operation is as follows: The pump is anchored in the bottom of the well or whatevever place the water is to be drawn, and suitable power is applied to the plunger-rod J, which is made of any suitable length that is required, and when the plunger commences to rise the water is drawn in at the lower thimble, $a$, and the water above the plunger-head is forced out, at the thimble $c$, into the pipe B. (Shown with arrows in Fig. 1.) In the downward motion of the plunger the balls in thimbles $a$ and $c$ close the ports, and the balls in $d$ and $b$ open, and the water is drawn in at $d$ and forced out at $b$ into the pipe B, causing a continual flow of water.

Having thus described our invention, what we claim as new, and desire to secure by Letters Patent, is—

1. A thimble containing a ball-valve having its sides flaring, and its large end covered by a screen, substantially as and for the purpose set forth.

2. The combination of the valve-containing thimbles $a$ $b$ $c$ $d$ with the pump-body A and pipe B, as shown, and for the purpose specified.

JAMES T. DALE.
JOHN V. MYERS.

Witnesses:
THOS. J. PRICE,
D. G. PRICE.